Nov. 13, 1962 D. L. JAFFE 3,064,207

REFLEX KLYSTRON REACTANCE TUBE CIRCUITS

Filed May 13, 1960 3 Sheets-Sheet 1

INVENTOR
D. LAWRENCE JAFFE
BY Darby & Darby
ATTORNEYS

Nov. 13, 1962 D. L. JAFFE 3,064,207

REFLEX KLYSTRON REACTANCE TUBE CIRCUITS

Filed May 13, 1960 3 Sheets-Sheet 2

INVENTOR
D. LAWRENCE JAFFE
BY Darby & Darby
ATTORNEYS

REFLEX KLYSTRON REACTANCE TUBE CIRCUITS

Filed May 13, 1960 3 Sheets-Sheet 3

INVENTOR
D. LAWRENCE JAFFE
BY Darby & Darby
ATTORNEYS

United States Patent Office 3,064,207

Patented Nov. 13, 1962

3,064,207

REFLEX KLYSTRON REACTANCE TUBE CIRCUITS

David Lawrence Jaffe, Great Neck, N.Y., assignor to Polarad Electronics Corporation, Long Island City, N.Y., a corporation of New York Filed May 13, 1960, Ser. No. 28,993
18 Claims. (Cl. 332—7)

This invention relates generally to high frequency oscillator systems and more particularly to reflex klystron reactance tube circuits suitable for use as variable frequency determining elements of such oscillator systems. This application is a continuation-in-part of my copending application Serial No. 840,773, filed September 17, 1959, and assigned to the same assignee, now abandoned.

In many circuit applications it is desirable to have an element whose reactance varies as a function of the amplitude of an applied signal. One such circuit element is a conventional vacuum tube, which when connected in a reactance tube circuit may be used in any of a variety of applications, for example, in a frequency-modulation circuit. In the typical frequency-modulation circuit, the reactance tube is connected in parallel with a resonant circuit, which is the frequency determining element of an oscillator. By applying a varying amplitude signal to the reactance tube, and changing its reactance in accordance therewith, the impedance of the resonant circuit, and hence the frequency of oscillations produced by the oscillator may be varied. In this manner, a signal of varying amplitude is used to control a variable frequency oscillator, by means of the reactance tube.

In the ultra-high-frequency and the super-high-frequency communication ranges (for example those frequencies above 300 megacycles) conventional circuit elements such as resistors, capacitors, inductors, conductors and ordinary vacuum tubes designed for use at low frequencies, behave differently than at the lower frequencies. In many high frequency applications these conventional lumped parameter low-frequency elements produce unexpected results which are deleterious to the operation of the circuit in which they are employed. This is particularly true in high frequency oscillator circuits. In many high frequency circuits, conventional circuit components, such as those listed above, cannot be readily constructed or in some instances cannot be fabricated at all.

In order to be able to operate electronic equipment in the ultra-high-frequency and super-high-frequency ranges, it has been necessary to design and utilize new circuit components. One such component is the reflex klystron tube. As is well known, the reflex klystron tube has the properties of a variable reactance element whose electrical parameters, i.e., resistance and reactance when expressed in terms of impedance, or conductance and susceptance when expressed in terms of admittance, may be varied by changing the conditions under which the klystron operates. It has previously been proposed to make use of a variation in the reactance of a klystron tube by connecting it in parallel as a load with a second klystron tube or other high frequency oscillator, which is in a state of oscillation, in a manner similar to that used in a conventional vacuum tube circuit. The reactance of the first klystron is then changed by varying its operating conditions, which in turn varies the parallel load into which the oscillator delivers its output.

The present invention is concerned with a klystron tube which is used as a reactance element connected in series with another tube which is operating as an oscillator. By suitably constructing the two tubes within a cavity resonator and by varying the conditions under which the klystron reactance tube operates, it is possible to vary the frequency of oscillations produced by the series connected oscillator tube over a wide range.

The series arrangement of the tubes has been found to be practical to construct and produces a wide range of frequency variation under the control of relatively small changes of operating conditions of the klystron reactance tube.

It is therefore an object of this invention to provide a klystron tube circuit which may be used as a variable impedance.

Another object of this invention is to provide klystron reactance tube circuits for producing wide ranges of frequency modulation.

Still another object of this invention is to provide a klystron reactance tube circuit which may be used as a series reactance in conjunction with a high frequency oscillator.

Yet another object of this invention is to provide a klystron reactance tube circuit utilizing an external coaxial cavity resonator.

A further object of this invention is to provide a klystron reactance tube circuit utilizing a klystron tube as a variable series reactance in conjunction with the inner conductor of a coaxial cavity resonator and a high frequency klystron oscillator.

Another object of this invention is to provide the combination of a reflex klystron oscillator, a reflex klystron reactance tube, and an external coaxial cavity resonator which is tunable over a wide range of frequency variation, wherein the component tube parts may be readily replaced without disassembly of the entire combination thereby providing an assembly which is relatively simple to fabricate and maintain in an economical manner.

A further object of this invention is to provide a klystron reactance tube circuit utilizing a klystron tube as a series reactance in conjunction with a high frequency klystron oscillator and the two inner conductors of a balanced line coaxial cavity resonator.

Other objects and advantages of this invention may be recognized by referring to the accompanying drawings and specification in which, FIGURE 1 is a graphical representation of the admittance characteristics of a reflex klystron tube as a function of electron transit angle;

Figure 1:
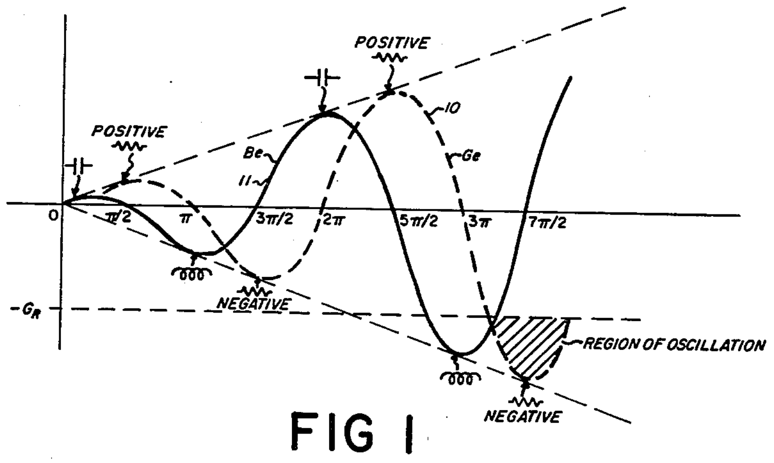

In accordance with the objecs of this invention, variable reactance tube circuits are provided which utilize reflex klystron tubes. In the preferred embodiments of the circuits illustrated, two reflex klystron tubes are located within a coaxial cavity resonator. The operating condition of one of the tubes is adjusted so that it functions in conjunction with the resonator, in a series resonance mode of operation, as an oscillator, capable of producing frequency modulated oscillations. The other tube is connected in series with the klystron oscillator through the medium of the inner conductor of the coaxial cavity resonator and is used as a variable reactance element. The reactance of the second tube is varied by controlling one or more of its operating conditions, for example, the reflector voltage or the control grid bias. In this manner, the klystron oscillator tube operates into a series connected load whose reactance, the inductance of the inner conductor of the coaxial cavity resonator and the controllable reactance of the second klystron tube, may varied at will. By varying the reactance of the series connected load, the output frequency of the oscillator klystron tube may be changed.

As is well known, a reflex klystron is a velocity modulated electronic discharge tube. A typical reflex klystron, use for operation with an external cavity, comprises an evacuated housing having located therein a cathode electrode for emitting an electron stream; a control grid for controlling the electron beam current; an accelerating electrode for imparting a high velocity to the electrons in the stream; a pair of resonator grids forming an interaction gap space which has a variable electronic impedance or admittance characteristic therebetween; and a reflector electrode for controlling the transit angle of the electrons.

The electronic parameters of a klystron tube can be expressed either in terms of impedance or in terms of admittance; the former being useful when circuit analysis is performed on series connected elements, the latter being useful for mathematical manipulation when the circuit analysis is performed on parallel connected elements, as is well understood by those familiar with electrical engineering theory. In the following discussion referring to FIGURE 1, mention is made of the electronic admittance of a klystron tube; however, it should be realized that by familiar methematical methods, the real and imaginary admittance components of conductance and susceptance may be equated to the real and imaginary impedance components of resistance and reactance, and thus what follows should be understood to relate equally to one form of expression of the electronic characteristics of a reflex klystron tube as to the other.

The electronic admittance $Y_e$ of the gap between the two resonator grids of a reflux klystron tube is physically represented by a conductance $G_e$ which is shunted by a susceptance $B_e$. The formula for the electronic admittance $Y_e$ of the gap space of a reflex klystron under the conditions of zero gap voltage may be expressed as follows:

(1) $$Y_e = A^2 G_0 T_0 \frac{J_1(K)}{K} E^{\frac{-j(T_0-\pi)}{2}}$$

Where:

$A$=beam coupling coefficients$=\frac{\sin(\theta_g/2)}{(\theta_g/2)}$ $\theta$=transit angle in radians $G_0$=D.C. beam conductance$=\frac{I_0}{V_0}$ $I_0$=beam current at zero gap voltage $V_0$=the gap voltage $T_0$=D.C. transit angle in radians spent in reflector space $K=A\alpha T_0$=the bunching parameter $\alpha$=excitation voltage ratio $\frac{J_1(K)}{K}$=Bessel function of the first order, having the argument K.

For a more detailed explanation of these quantities, reference is made to Spangenberg, "Vacuum Tubes," McGraw Hill, 1954.

The electronic admittance $Y_e$ of Equation 1 may be represented by the real and imaginary parts of the admittance:

(2) $$Y_e = G_e + jB_e$$

The real part of the Equation 2 is the conductance $G_e$ and the imaginary part is the susceptance $B_e$.

As can be seen from Equation 1, the electronic admittance of the tube is controlled by several variable fctors. Two of these are the transit angle $T_0$ and the D.C. beam conductance $G_0$. The transit angle $T_0$ can be varied by changing the voltage applied to the reflector electrode of the klystron, while the conductance can be varied by changing the voltage applied to the control grid of the klystron tube, which controls the D.C. beam current.

FIGURE 1 shows the electron ic admittance of a klystron tube as a function of the D.C. transit angle for the value of K equal to zero, corresponding to zero R—F gap voltage. This makes the factor $$\frac{J(K)}{K}$$

equal to ½. The zero signal value of the beam conductance component $G_e$ of the admittance is shown by the dotted line 10 and the susceptive component $B_e$ is shown by the solid line 11. As can be seen, for various values of transit angles the electronic admittance (impedance) can be a positive or a negative conductance (resistance), and a negative susceptance (inductance) or a positive susceptance (capacitance). At certain values of transit angle, e.g., $\pi$, $2\pi$, $3\pi$, etc., electronic admittance (impedance) is purely susceptive (reactive), while at other values, e.g., $\pi/2$, $3\pi/2$, $5\pi/2$, etc., it is purely conductive (resistive). At transit angles between these values, the electronic admittance (impedance) contains both conductive (resistive) and susceptive (reactive) components. All these conditions may be obtained by variation of the transit angle, which is accomplished by a change in the klystron reflector electrode voltage.

In order to make the klystron oscillate the conductance $G_e$ must be negative and have an absolute value of magnitude for a zero gap voltage $V_0$ that is more than the shunt conductance $C_r$ developed by the resonator cavity across the gap of the resonator grids. Stated another way, when the electronic impedance of the klystron oscillator has a negative resistance component which is equal to the positive resistance of the associated resonator, sustained oscillations will occur. In FIGURE 1, the conductance (resistance) of the resonator cavity is such so that this condition occurs when a transit angle is between $3\pi$ and $7\pi/2$ radians. This oscillation phenomenon exhibited by a klystron tube operated within a cavity resonator (as described in terms of the electronic parameters of the tube) is well understood and no further explanation need be given here.

In the construction according to the present invention of variable reactance reflex klystron tube circuits two klystron tubes are provided. The reflector electrode of one tube is supplied a voltage so as to make it oscillate. The second tube acts as a load for the first tube and has its reflector electrode supplied with a voltage so that the second tube's D.C. transit angle is 90° different from the condition required for oscillation. Under this condition, no power is absorbed by the second tube, but a large reactance is introduced into the circuit. When the reflector voltage of the second tube is set so that its transit angle is not exactly 90° from the transit angle required for oscillation, some of the power produced by the first tube is absorbed by the second tube, since it presents a partially resistive load.

Figure 2:
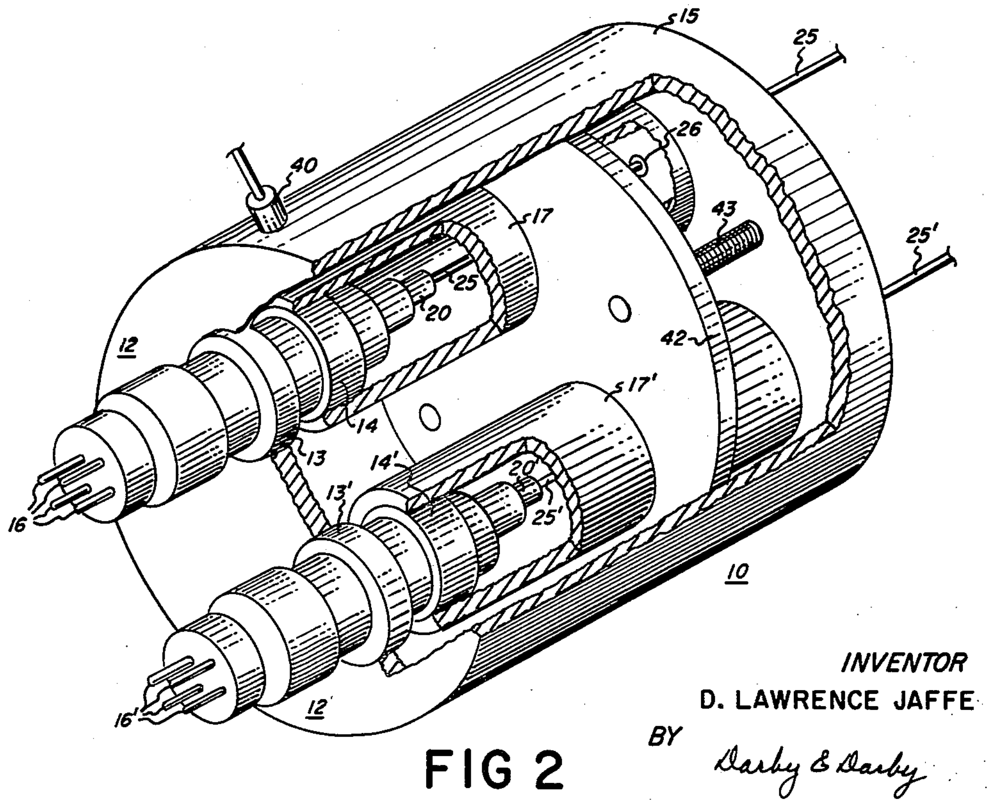
FIGURE 2 is a perspective, partially fragmentary, view of one embodiment of the invention.

One embodiment of a variable reactance circuit using series connected klystron tubes is shown in FIGURE 2. In FIGURE 2, two external cavity reflex klystron tubes, the oscillator tube 12 and the variable reactance tube 12', are located within a reentrant coaxial type cavity resonator 10. Reflex klystrons suitable for operation in this invention are the ZV1009 ceramic tube manufactured by the assignee of this application, which has an operating range of 1500 to 6000 megacycles. Other suitable tubes operating at different frequencies may also be utilized. The cavity resonator 10 is formed of any suitable metallic element and is of a size and shape which is capable of operating in the desired frequency range. The coaxial resonator is formed by an outer conductor wall 15 and two hollow inner conductors 17 and 17' forming thereby the balanced coaxial line structure well known in the art. The inner conductors 17 and 17' are provided at one end thereof with a respective insulating seal 26 through which electrical connectors 25 and 25' are run. The resonator has a movable tuning short 42, which contacts the inner conductors 17 and 17' and the inside of the outer wall 15 of the resonator. The tuning short 42 effectively connects conductors 17 and 17' in series and forms a series inductance whose magnitude is varied by the position of the short. The tuning short 42 is manipulated by suitable positioning elements such as threaded screw member 43, which is accessible from the exterior of the cavity and which serves to adjust the effective electrical length of the inductive path formed by the two series connected hollow inner conductors 17 and 17'. The resonator has a probe 40 extending into it which serves to extract energy from the cavity and supply it to any desired elements of a microwave system in a familiar manner.

The structural configuration of the two reflex klystron tubes, as shown in FIGURE 2, includes tube prong groups 16 and 16' which provide external access to the electrode elements described in detail later; disc seal contact rings 13 and 13', and 14 and 14', which connect to the lower and upper resonator grid elements of the respective tubes; and reflector electrode caps 20 and 20' which are brought out to external connections from inside the respective hollow conductors 17 and 17' by means of the leads 25 and 25' passing through insulated seals 26.

Figure 3:
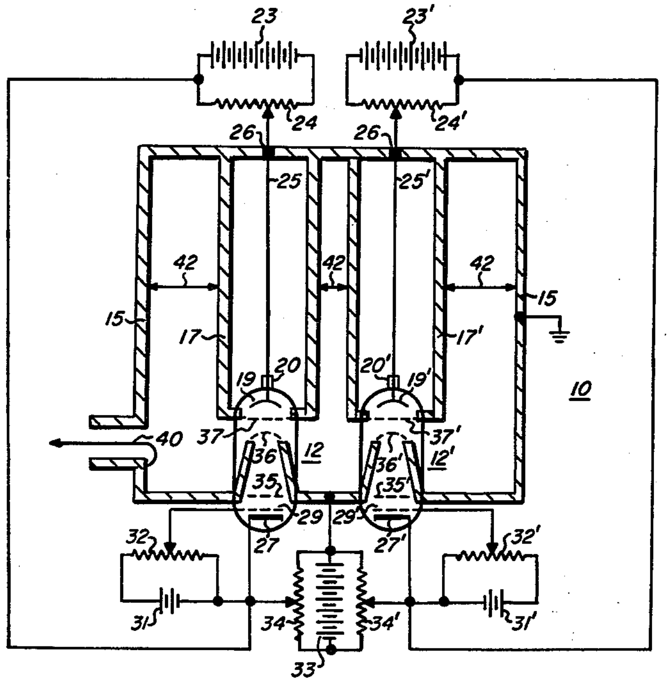
FIGURE 3 is a cross-sectional, partially diagrammatic, perspective view of the embodiment of FIGURE 2.

Referring now to the diagrammatic view of FIGURE 3, a more detailed illustration of the electrical and tube electrode connections is given, wherein similar numerals correspond to similar elements shown in FIGURE 2. As before, the oscillator tube 12 and reactance tube 12' are inserted within the reentrant coaxial cavity resonator 10 which includes the outer wall 15, two inner conductors 17 and 17', tuning short 42, and probe 40. The cap 20 for the reflector electrode 19 of the klystron 12 is located within the hollow conductor 17 and the cap 20' for the reflector electrode 19' of the reactance tube 12' is similarly located within the conductor 17'. The reflector electrodes 19 and 19' are each connected to a reflector variable voltage control source formed by the respective batteries 23, 23', and potentiometers 24, 24', by means of the caps 20 and 20' and lead wires 25 and 25', which are brought out of the top wall of the resonator 10, through the insulated seals 26. By means of the variable voltage control each of the reflector electrodes 19 and 19' is maintained at some suitable negative potential with respect to the corresponding cathode electrode 27, 27' provided for each of the klystron tubes.

Each of the cathode electrodes 27, 27' is heated by a filament (not shown) to act as a source of electrons and is maintained at some suitable negative potential with respect to ground (the potential of the resonator 10) by means of the variable slider arms of respective potentiometers 34, 34' which are connected across the battery 33. Each of the klystron tubes also has a control grid 29, 29' which is connected to a source of biasing potential (slightly positive with respect to the cathode) formed by respective batteries 31, 31' and potentiometers 32, 32'. The control grids 29, 29' serve to control the electron beam of its respective tube in a manner which is well known. Each tube also has a respective accelerator grid 35, 35', which is maintained at ground potential (and thus is positive with respect to the cathode 27, 27') through attachment to the outer conductor 15 of the cavity resonator 10 by a connection to the external disc rings 13, 13' (see FIG. 2). Each of the klystron tubes has a funnel shaped lower resonator grid 36, 36' which is connected to the outer conductor 15 of the resonator 10 by the external disc seal 13, 13', and an upper resonator grid 37, 37' connected to its respective inner conductor 17, 17' by means of respective disc seal rings 14, 14' (see FIG. 2). The resonator grid pairs 36 and 37, and 36' and 37', serve to define an interaction gap wherein on the first transit pass of the electrons the bunching of the electrons occurs. On the return transit pass energy is given up by the velocity modulated electron stream to the resonator cavity where it is picked up by the probe 40 in a well understood operation which needs no further explanation here.

Figure 4:
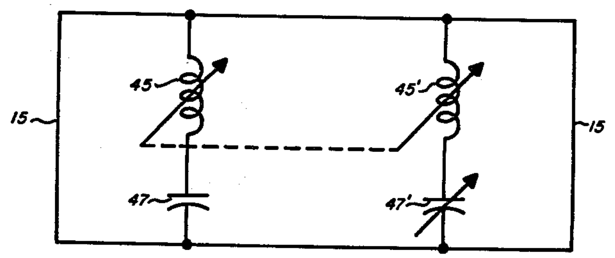
FIGURE 4 is a schematic representation of the embodiment of the invention shown in FIGURE 2.

As shown, the structure of FIGURES 2 and 3 is essentially a balanced coaxial line which is formed by the two inner conductors 17, 17' and the outer conductor 15 of the external cavity resonator 10. The balanced line structure is shorted at one end by the movable tuning stub 42. The electronic admittance (impedance) formed by the respective resonator grids 35 and 36, and 35' and 36' terminates the line at the open end. A simplified schematic representation of this arrangement is shown in FIGURE 4 wherein the variable inductances 45 and 45' may be considered the inductance presented by the shorted inner conductors 17 and 17' of the reentrant coaxial cavity resonator and the capacitances 47 and 47' may be considered the interaction gap capacitors formed by the respective upper and lower resonator grids of the two klystron tubes 12 and 12'. The cavity resonator outer conductor 15 is represented as a short, since for all practical purposes, the inner conductors 17, 17' represent the greater part of the inductive circuit. The value of the inductive portion of the circuit may be varied by displacement of the movable tuning short 42, thereby changing the resonant frequency of the cavity resonator 15. As will be seen subsequently, the frequency of the resonator may also be changed by varying the electronic characteristics of the reactance tube 12'.

In operation, the mode of oscillation of the resonator 10 desired is that which utilizes series resonance of the inductance 45 and 45' and the capacitances 47 and 47'. As is well known, the natural frequency of oscillation $f_0$ in such a circuit is equal to $$f_0=\frac{1}{2\pi\sqrt{LC}}$$

when the resistance in the circuit is zero or negligible. In order to sustain oscillation, the reflector voltage of the oscillator tube 12 is adjusted to establish a negative resistance (conductance) for the tube as a whole by varying the voltage applied to the reflector electrode 19 via the potentiometer 24. When properly adjusted, this negative resistance (conductance) condition cancels the positive resistance (conductance) of the resonator 10 and permits the tube 12 to maintain sustained oscillations. Reactance tube 12' is then adjusted to set its equivalent electronic characteristic, as represented by the variable capacitor 47' of FIGURE 4, at the required value of reactance (susceptance) for the desired resonant frequency of operation, by varying the potential applied to its reflector electrode from the center arm of potentiometer 24'. The reactance (susceptance) of the klystron tube 12' may also be varied by controlling the electron beam current by means of control grid 29'. While the control grid 29' is shown as connected to the voltage dividing potentiometer 32', it should be realized that it may be connected to a varying voltage source such as a speech modulator, function generator, etc. The varying reactance control voltage may, in the alternative, be applied to the reflector electrode 19', if desired.

The impedance of the klystron tube 12' is varied over a wide range of pure reactance value, either negative or positive in character, that is, either capacitive or inductive, by proper adjustment of the reflector potential or the control grid potential.

The varying reactance tube 12' is electromagnetically coupled to the oscillator tube 12 in the cavity resonator 10 through the series connection of the inductive inner conductor elements 17 and 17'. A change in the resonant frequency of a cavity resonator occurs when either the reactance of the tube 12' is varied or tuning short 42 is positioned into a new location. Such changes in resonant frequency necessarily produce a change in the output frequency of the oscillator. Accordingly, this apparatus provides a readily adjustable oscillator frequency which is variable over a wide range. The output frequency can be adjusted mechanically, by adjusting the position of the tuning short, or electrically, by controlling either one of the reflector or control grid voltages. The structure of FIGURES 2 and 3 may also be used to keep a constant frequency of oscillation from the tube 12 by controlling one or more of the impedance determining voltages in response to the frequency condition of the oscillatior in any conventional manner known in the automatic frequency control art, for example, a frequency determining servo loop which adjusts the impedance determining voltage in response to the oscillator frequency.

Figure 5:
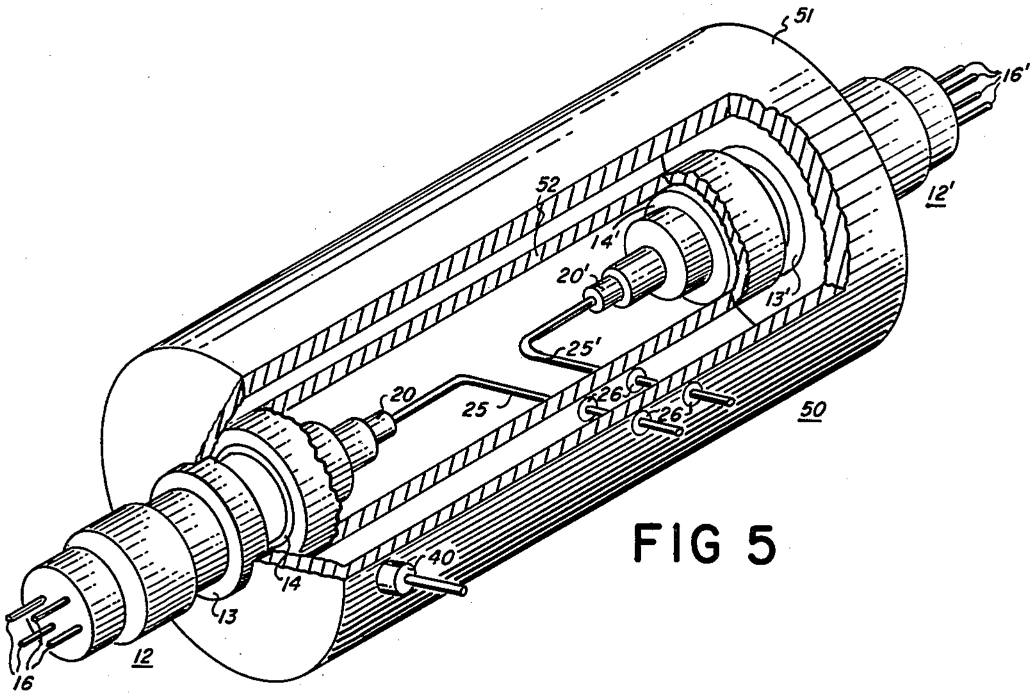
FIGURE 5 shows a perspective, partially fragmentary, view of another embodiment of the invention.
Figure 6:
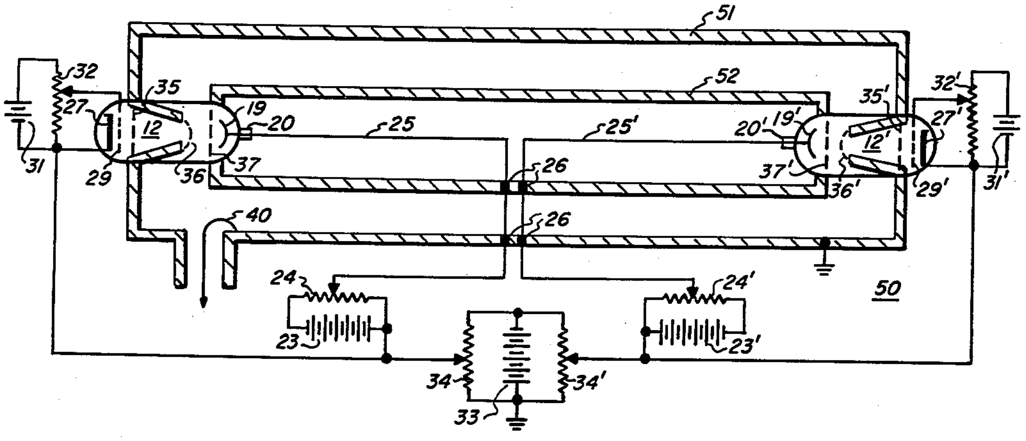
FIGURE 6 shows a cross-sectional, partially diagrammatic, perspective view of the embodiment of the invention shown in FIGURE 5.

Referring to FIGURES 5 and 6, another form of reflex klystron reactance tube circuit is shown. In this embodiment similar elements are designated with the same reference characters shown in FIGURES 3 and 4. In the embodiment of FIGURES 5 and 6 only a single inner coaxial conductor is employed and no movable short, such as the tuning stub 42, is required. The series resonance connected klystron reactance tube circuit of FIGURE 5 has a reentrant type coaxial cavity resonator 50 which is formed by a cylindrical outer conductor 51 and a hollow coaxial inner conductor 52 into which are inserted the reflex klystron tubes 12 and 12′. As before, a probe 40 is provided in the resonator 50 for extracting energy produced by the oscillator 12. Leads 25 and 25′, which are insulated from the resonator structure by seals 26, are provided for applying respective voltages to the caps 20, 20′ connected to the repeller electrodes of the respective tubes 12, 12′. The lower and upper resonator grids of the tubes make electrical connection with the outer and inner coaxial conductors 51 and 52, respectively, by means of the klystron disc seal rings 13, 13′, and 14, 14′. The klystron tubes utilized in this embodiment and the various operating potentials therefor may be the same as those used in the form shown in FIGURES 2 and 3 and thus no further description will be given here, since the operation of the components of this embodiment is similar to the one previously disclosed.

Figure 7:
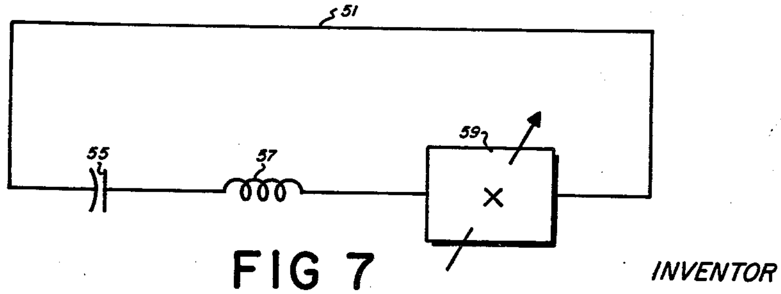
FIGURE 7 shows a schematic representation of the embodiment of the invention shown in FIGURE 5.

Referring to FIGURE 7, the operation of the circuit of FIGURES 5 and 6 will now be explained. The mode of oscillations desired utilizes the series resonance of the circuit. The capacitor 55 represents the capacitance of the interaction gap between the resonator grids 35 and 36 of oscillator tube 12 and the inductance 57 represents the fixed inductance of the inner conductor 52. Block 59, labeled X, represents the reactance to which the right hand klystron tube 12′ is tuned. The outer conductor 51 of the cavity resonator 50 is represented as a short, since for all practical purposes the inner conductor 52 represents the greater part of the inductive circuit. In operation, the voltage applied to the reflector electrode 19 from the slider arm of potentiometer 24 is adjusted so that the reflex klystron tube 12 oscillates. The reflector 19′ of the right hand klystron tube 12′ is supplied with a voltage from the potentiometer 24′ which makes its gap impedance purely reactive. By varying the bias from the potentiometer 32′ to the control grid 29′, the electron beam current is controlled, and hence, the reactance of the klystron tube 12′ may also be varied. As in the case of the embodiment shown in FIGURES 2 and 3, the control voltage applied to the control grid 29′ may be from a variable source, thereby controlling the reactance of the klystron tube 12′ in a variable manner. Variation of the reactance of tube 12, by changing its electrical inductance or capacitance, is equivalent to changing the electrical length of the coaxial inner conductor 52 by a shorting stub. Thus, variation of the potential of the reflector electrode 19′ or the control grid 29′ of the reactance tube 12′ corresponds to the positioning of a shorting member in the coaxial line structure formed by the reentrant cavity resonator 50. This eliminates the need for mechanically varying the effective electrical length of the coaxial cavity resonator in order to achieve frequency tuning.

Therefore it is seen that reactance tube circuits utilizing two reflex klystron tubes connected in a series resonance manner have been described. One of the klystron tubes in the circuit is an oscillator and its variable load impedance is supplied by varying the reactance of the other klystron tube in the circuit. In this manner, wide ranges of frequency modulation may be obtained in the ultra-high frequency ranges by the application of relatively small control voltages to the impedance controlling electrodes of the variable reactance klystron. In addition, the utilization of disc seal type reflex klystrons, in a coaxial cavity resonator based upon the configuration shown, permits the ready replacement of the klystron tubes, should either of them malfunction without necessitating disassembly of the entire resonator structure. Furthermore, the inductive reactance of the inner conductor of the coaxial resonator utilized in the invention cooperates with the reactance tube in a series resonance arrangement yielding a tuned circuit which is capable of variation over a considerable range of frequencies without the use of mechanically positioned shorting elements. When a shorting element is used in a resonator structure, constructed in accordance with the invention, in conjunction with the variable and controllable impedance parameters provided by the reactance tube, a greatly increased range of frequency modulation is available for a given resonator structure and klystron tube pair.

While the preferred embodiments of the invention described and illustrated show reactance tube circuits wherein the klystron tubes are inserted within an external cavity resonator, it should be realized that separate tube sections may be used in an integral assembly within an evacuated cavity resonator.

While I have described prefered embodiments of the invention it should be understood that I wish to be limited not by the foregoing description but solely by the claims granted to me.

What is claimed is:

1. A variable reactance circuit for use at high frequencies comprising an external cavity resonator, first and second oscillator tubes, each of said tubes having a pair of resonator grids which form a gap having a controllable variable admittance, means for mounting the tubes within said cavity resonator in electrical series resonance relationship, means connected to one of said tubes for setting the admittance of the gap of that tube to have a value which makes the tube oscillate, and means connected to the other of said tubes for setting the admittance of the gap of that tube to have a susceptive component.

2. A klystron tube variable reactance circuit for use at high frequencies comprising an external cavity resonator, first and second klystron tubes, each of said klystron tubes having a pair of resonator grids which form a gap having a controllable variable admittance and a reflector electrode for controlling the admittance of the gap, means for mounting the klystrons within said cavity resonator in electrical series resonance relationship so that their reflector electrodes are coupled, means connected to the reflector electrode of one of said klystron tubes for setting the admittance of the gap of that tube to have a value which makes the tube oscillate, and means connected to the reflector electrode of said other klystron for setting the admittance of the gap of that tube to have a susceptive component.

3. A klystron tube variable reactance circuit for use at high frequencies comprising an external cavity resonator, first and second klystron tubes, each of said klystron tubes having a pair of resonator grids which form a gap having a controllable variable admittance and a reflector electrode for controlling the admittance of the gap, means for mounting the klystrons within said cavity resonator in electrical series resonance relationship so that their reflector electrodes are coupled, means connected to the reflector electrode of one of said klystron tubes for setting the admittance of the gap of that tube to have a value which makes the tube oscillate, means connected to the reflector electrode of said other klystron for setting the admittance of the gap of that tube to have a susceptive component, and means for varying the admittance of the gap of said other klystron whereby the resonant frequency of the structure is varied.

4. A variable reactance circuit for use at high frequencies comprising a cavity resonator having an outer conductor and at least one inner conductor, first and second electron discharge tubes, each of said tubes having a pair of resonator grids which forms an interaction gap therebetween having a controllable variable electronic impedance parameter, means for mounting the tubes within said resonator in a resonant circuit relationship with said conductors, means connected to said first tube for varying the electronic impedance parameter of its gap to make that tube maintain sustained oscillations, and means connected to said second tube for setting the electronic impedance parameter, its gap to have a reactive component whereby said reactive component determines the frequency of oscillation of said series resonant structure.

5. The structure described in claim 4 further characterized by means for varying the effective electrical length of said conductors.

6. A variable reactance circuit for use at high frequencies comprising a cavity resonator, said resonator having an outer conductor and at least one hollow inner conductor, first and second reflex klystron tubes, each of said tubes having a pair of resonator grids which form an interaction gap therebetween having a controllable variable impedance parameter, means for mounting each of the tubes within said cavity resonator with said resonator grids of said tubes in a resonant circuit relationship with said conductors, means connected to one of said tubes for setting the impedance of the gap of that tube to have a value which makes the tube oscillate, and means connected to the other of said tubes for setting the impedance of the gap of that tube to have a reactive component whereby said reactive component determines the frequency of oscillation of said series resonant structure.

7. A resonator structure comprising a cavity resonator having an outer conductor and at least one inner conductor, first and second klystron tubes, each of said tubes having respective first and second resonator grids which form an interaction gap therebetween, means for mounting each of said tubes on said cavity resonator in a readily replaceable manner with one of said resonator grids of each of said tubes in electrical contact with said outer conductor of said resonator, and the other of said resonator grids of each of said tubes in electrical contact with an inner conductor of said resonator.

8. A klystron tube variable reactance circuit for use at high frequencies comprising a coaxial cavity resonator having an outer conductor and a hollow inner conductor, first and second klystron tubes, each of said klystron tubes having a pair of resonator grids which form an interaction gap there-between having a controllable variable impedance and an electrode for controlling the impedance of said gap, means for mounting the klystron tubes within said cavity resonator with said tubes disposed at the opposite ends of said hollow conductor so that said klystrons are coupled by said conductors in series resonant relationship, means connected to said electrode of said first klystron tube for setting the impedance of the gap of that tube to a value which makes the tube oscillate, and means connected to said electrode of said second tube for setting the impedance of the gap of that tube to have a controllable reactive component whereby said last named means determines the resonant frequency of oscillation of said series structure.

9. The combination set forth in claim 8 wherein said electrode is the reflector electrode of each said klystron tube.

10. The combination set forth in claim 8 wherein said electrode is the control grid electrode of each said klystron tube.

11. A high frequency oscillator circuit comprising an external reentrant-type cavity resonator having an outer conductor and at least one hollow inner conductor, first and second klystron tubes, means for mounting said first and second klystron tubes within said resonator in a series coupled manner such that the frequency of oscillation is determined by a resonant circuit comprising said klystron tubes, and said conductors.

12. The oscillator circuit of claim 11 wherein each of said klystron tubes has an impedance controlling means for varying the resistive and reactive components of the impedances of each of said klystron tubes from a positive to a negative value.

13. A klystron tube variable reactance circuit for use at high frequencies comprising a cavity resonator having an outer conductor and two hollow inner conductors mounted therein, first and second klystron tubes, each of said klystron tubes having a pair of resonator grids defining an interaction gap therebetween with a variable impedance, each of said klystron tubes having a reflector electrode for controlling the variable impedance of said gap, said first and second klystron tubes located within said resonator in a manner such that the reflector electrode of each klystron tube is disposed within one of said hollow conductors, means connected to the reflector electrode of said first klystron tube for setting the impedance of the gap of that tube to a value which makes that tube oscillate, and means connected to the reflector electrode of said second klystron tube to cause the impedance of the gap of that tube to a variable reactive component.

14. The combination as set forth in claim 13 further including control grid means in each of said klystrons for varying its impedance components from a positive to a negative resistance value and from a positive to a negative reactance value.

15. A high frequency oscillator circuit comprising an external cavity resonator having an outer conductor and two hollow inner conductors, first and second reflex klystron tubes located within said resonator; each of said klystron tubes having an upper and a lower resonator grid refining an interaction gap therebetween with a variable impedance, a reflector electrode for controlling the variable impedance of said gap, and a control grid electrode for further controlling the variable impedance of said gap; means for mounting said first and second klystron tubes within said resonator with said upper resonator grid of each of said klystron tubes in electrical contact with one of said hollow inner conductors, and said lower resonator grid of each of said klystron tubes in electrical contact with said outer conductor of said cavity resonator; means connected to one of said electrodes of said first klystron tube for setting the impedance of the gap of that tube to a value which makes that tube oscillate; and means connected to one of said electrodes of said second klystron tube to cause the impedance of the gap of that tube to have a variable reactive component.

16. The oscillator combination as set forth in claim 15 further including movable shorting means making electrical contact with said inner and outer conductors for varying the effective electrical length of said conductors of said cavity resonator.

17. A resonator structure comprising a cavity resonator having an outer conductor and first and second inner conductors, first and second klystrons tubes, each of said tubes having respective first and second resonator grids which form an interaction gap therebetween, means for mounting each of said tubes on said cavity resonator in a readily replaceable manner with one of said resonator grids of each of said tubes in electrical contact with said outer conductor and the other of said resonator grids of each of said tubes in electrical contact with a respective inner conductor of said cavity resonator.

18. A coaxial cavity resonator structure comprising a cavity resonator having an outer conductor and a single coaxial inner conductor, first and second klystron tubes, each of said tubes having first and second resonator grids which form an interaction gap therebetween, means for mounting said tubes on said cavity resonator in readily replaceable manner with one of said resonator grids of each of said tubes in electrical contact with said outer conductor and the other of said resonator grids of each of said tubes in electrical contact with the inner conductor of said cavity resonator.

References Cited in the file of this patent

UNITED STATES PATENTS 2,406,371 Hansen et al. ------------ Aug. 27, 1946

FOREIGN PATENTS 670,257 Great Britain ---------- Apr. 16, 1952